United States Patent
Usui et al.

(10) Patent No.: US 6,610,226 B2
(45) Date of Patent: *Aug. 26, 2003

(54) METHOD FOR CONTROLLING MOTOR-DRIVEN INJECTION MOLDING MACHINE

(75) Inventors: Kazuo Usui, Nagano (JP); Shuichi Arai, Nagano (JP); Syuichi Hokino, Nagano (JP)

(73) Assignee: Nissei Plastic Industrial Co., Ltd., Nagano-ken (JP)

(*) Notice: Subject to any disclaimer, the term of this patent is extended or adjusted under 35 U.S.C. 154(b) by 232 days.

This patent is subject to a terminal disclaimer.

(21) Appl. No.: 09/795,361

(22) Filed: Mar. 1, 2001

(65) Prior Publication Data

US 2001/0019185 A1 Sep. 6, 2001

(30) Foreign Application Priority Data

Mar. 1, 2000 (JP) ......................................... 2000-056249

(51) Int. Cl.[7] .............................................. B29C 45/76
(52) U.S. Cl. ................................... 264/40.1; 264/328.1
(58) Field of Search .............................. 264/40.1, 328.1

(56) References Cited

U.S. PATENT DOCUMENTS 5,792,395 A * 8/1998 Ito et al. ..................... 264/40.1

FOREIGN PATENT DOCUMENTS

JP        A11235743        8/1999

* cited by examiner

*Primary Examiner*—Jill L. Heitbrink
(74) *Attorney, Agent, or Firm*—Birch, Stewart, Kolasch & Birch, LLP

(57) ABSTRACT

A method for controlling a motor-driven injection molding machine which includes a plurality of drive motors. In the method, load current flowing through at least one drive motor serving as a drive source is detected in order to estimate heat generation value of the drive motor. When the estimated heat generation value reaches a preset stopping point, the drive motor is stopped. When the estimated heat generation value reaches a preset alarming point, which is lower than the stopping point, an alarm is issued.

8 Claims, 4 Drawing Sheets

METHOD FOR CONTROLLING MOTOR-DRIVEN INJECTION MOLDING MACHINE

BACKGROUND OF THE INVENTION

1. Field of the Invention

The present invention relates to a motor-driven injection molding machine using a drive motor (servomotor) serving as a drive source.

2. Description of the Relevant Art

Generally, a motor-driven injection molding machine using a servomotor as a drive source potentially involves malfunction or breakage of the servomotor due to overheat arising under certain molding conditions or under a certain environment, since the servomotor generates heat according to load current. Therefore, the motor-driven injection molding machine usually employs measures for protection of the servomotor. Specifically, a heat generation value of the servomotor is detected. When the detected heat generation value reaches a preset stopping point, the value is interpreted as indicating overload, and the servomotor is forcibly stopped to thereby protect the servomotor.

For an injection molding machine, stoppage of a servomotor during molding means interruption of a molding process, which may have an adverse effect on the molding process once resumed. Therefore, interruption of a molding process must be avoided to the extent possible. In order to meet the end, for example, Japanese Patent Application Laid-Open (kokai) No. 11(1999)-235743 proposes a method for checking preset operating conditions. According to the proposed method, the injection molding machine is operated on a trial basis in order to judge, from load current flowing through a servomotor, whether or not the servomotor operates in an overloaded unstable region. When the servomotor operates in the overloaded unstable region, the preset operating conditions are reviewed so as to impart appropriate allowance thereto, to thereby avoid interruption of operation (molding process) during actual molding.

The above-mentioned conventional method involves the following problems.

First, since operating conditions are reviewed merely at the stage of trial operation, the review fails to reflect operating conditions during actual molding. Thus, interruption of molding cannot be reliably avoided; i.e., reliability in avoidance of operational interruption is rather poor.

Second, since the preset operating conditions are reviewed at the stage of trial operation so as to impart appropriate allowance thereto, the injection molding machine may fail to operate under optimum operating conditions, resulting in impaired molding quality or productivity.

SUMMARY OF THE INVENTION

An object of the present invention is to provide a method for controlling a motor-driven injection molding machine capable of reliably avoiding interruption of molding caused by merely transient overload, to thereby improve reliability.

Another object of the present invention is to provide a method for controlling a motor-driven injection molding machine capable of always conducting molding under optimum molding conditions to thereby avoid impairment in molding quality and productivity.

To achieve the above objects, the present invention provides a method for controlling a motor-driven injection molding machine which includes a plurality of drive motors.

In the method, load current flowing through at least one drive motor serving as a drive source is detected in order to estimate heat generation value of the drive motor. When the estimated heat generation value reaches a preset stopping point, the drive motor is stopped. When the estimated heat generation value reaches a preset alarming point, which is lower than the stopping point, an alarm is issued.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

The configuration of a motor-driven injection molding machine 1 capable of carrying out a control method according to the present embodiment will be described with reference to FIG. 3.

Figure 3:
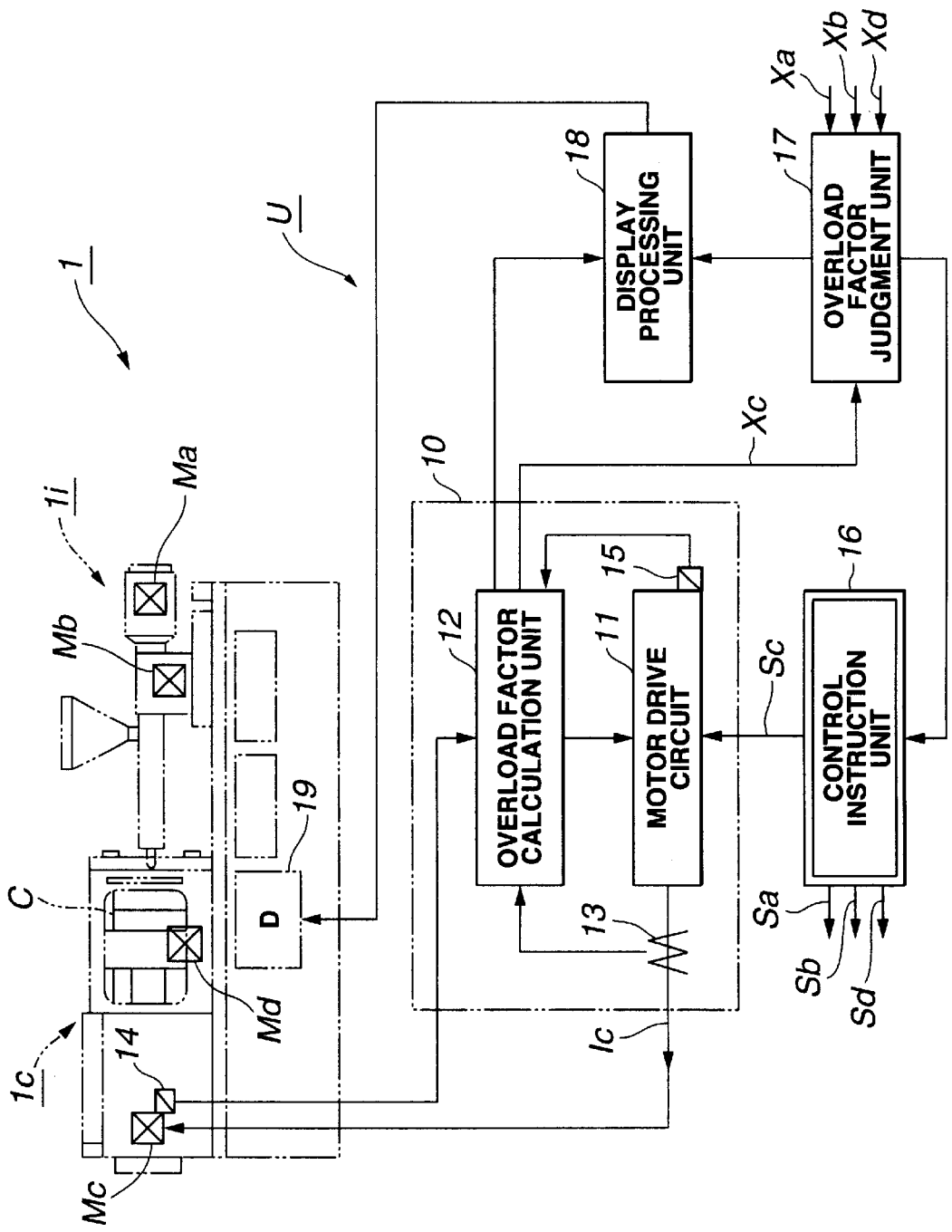
FIG. 3 is a block diagram of the control system of a motor-driven injection molding machine capable of carrying out the control method.

FIG. 3 shows a control system for controlling a mold-clamping motor (servomotor) Mc, which serves as a drive source of a mold-clamping mechanism installed in a mold-clamping unit 1c for clamping a mold C. Reference numeral 10 denotes a servoamplifier. The servoamplifier 10 includes a motor drive circuit 11 for driving the mold-clamping motor Mc and an overload factor calculation unit 12 for calculating overload factor Xc (%) (estimated heat generation value) from load current Ic flowing through the mold-clamping motor Mc. In order to detect the magnitude of the load current Ic flowing through the mold-clamping motor Mc, a current sensor 13 is disposed in a connection line connecting the motor drive circuit 11 and the mold-clamping motor Mc. The load current Ic detected by the current sensor 13 is supplied to the overload factor calculation unit 12.

A first thermostat 14 is attached to the mold-clamping motor Mc in order to directly detect the temperature of the mold-clamping motor Mc. Upon detection of a preset temperature, the first thermostat 14 outputs an overload detection signal. A second thermostat 15 is attached to the motor drive circuit 11 in order to directly detect the temperature of the motor drive circuit 11. Upon detection of a preset temperature, the second thermostat 15 outputs an overload detection signal. The first thermostat 14 and the second thermostat 15 are connected to the overload factor calculation unit 12.

Reference character U denotes a controller having computer-processing functions. The controller U includes a control instruction unit 16 and an overload factor judgment unit 17, which both operate under computer-processing functions, as well as a display processing unit 18. The overload factor calculation unit 12 supplies the overload factor Xc to the overload factor judgment unit 17. The overload factor judgment unit 17 supplies the result of judgment to the control instruction unit 16 and the display processing unit 18. The control instruction unit 16 supplies the motor drive circuit 11 with a control signal Sc for controlling the mold-clamping motor Mc. The overload factor calculation unit 12 is connected to the display processing unit 18 and the motor drive circuit 11. An output terminal of the display processing unit 18 is connected to a display 19.

In addition to the mold-clamping motor Mc, the motor-driven injection molding machine 1 further includes other drive motors; specifically, as shown in FIG. 3, an injection motor (servomotor) Ma for moving forward and backward a screw of an injection unit 1i; a measuring motor (servomotor) Mb for rotating the screw of the injection unit 1i; and an ejection motor (servomotor) Md for ejecting a molded article from the mold C of the mold-clamping unit Ic. As in the case of the mold-clamping motor Mc, the motors Ma, Mb, and Md are connected to respective servoamplifiers 10 similar to the servoamplifier 10 for the mold-clamping motor Mc. Overload factor calculation units 12 of the respective servoamplifiers 10 supply the overload factor judgment unit 17 with an overload factor Xa of the injection motor Ma, an overload factor Xb of the measuring motor Mb, and an overload factor Xd of the ejection motor Md. The control instruction unit 16 supplies motor drive circuits 11 of the respective servoamplifiers 10 with a control signal Sa for controlling the injection motor Ma, a control signal Sb for controlling the measuring motor Mb, and a control signal Sd for controlling the ejection motor Md. Also, the motors Ma, Mb, and Md are equipped with respective first thermostats 14 similar to the first thermostat 14 for the mold-clamping motor Mc, and the motor drive circuits 11 are equipped with respective second thermostats 15 similar to the second thermostat 15 for the mold-clamping motor Mc. The first thermostats 14 and the second thermostats 15 are connected to the corresponding overload factor calculation units 12.

A method for controlling the motor-driven injection molding machine 1 according to the present embodiment will next be described with reference to FIGS. 1 to 4.

Figure 4:
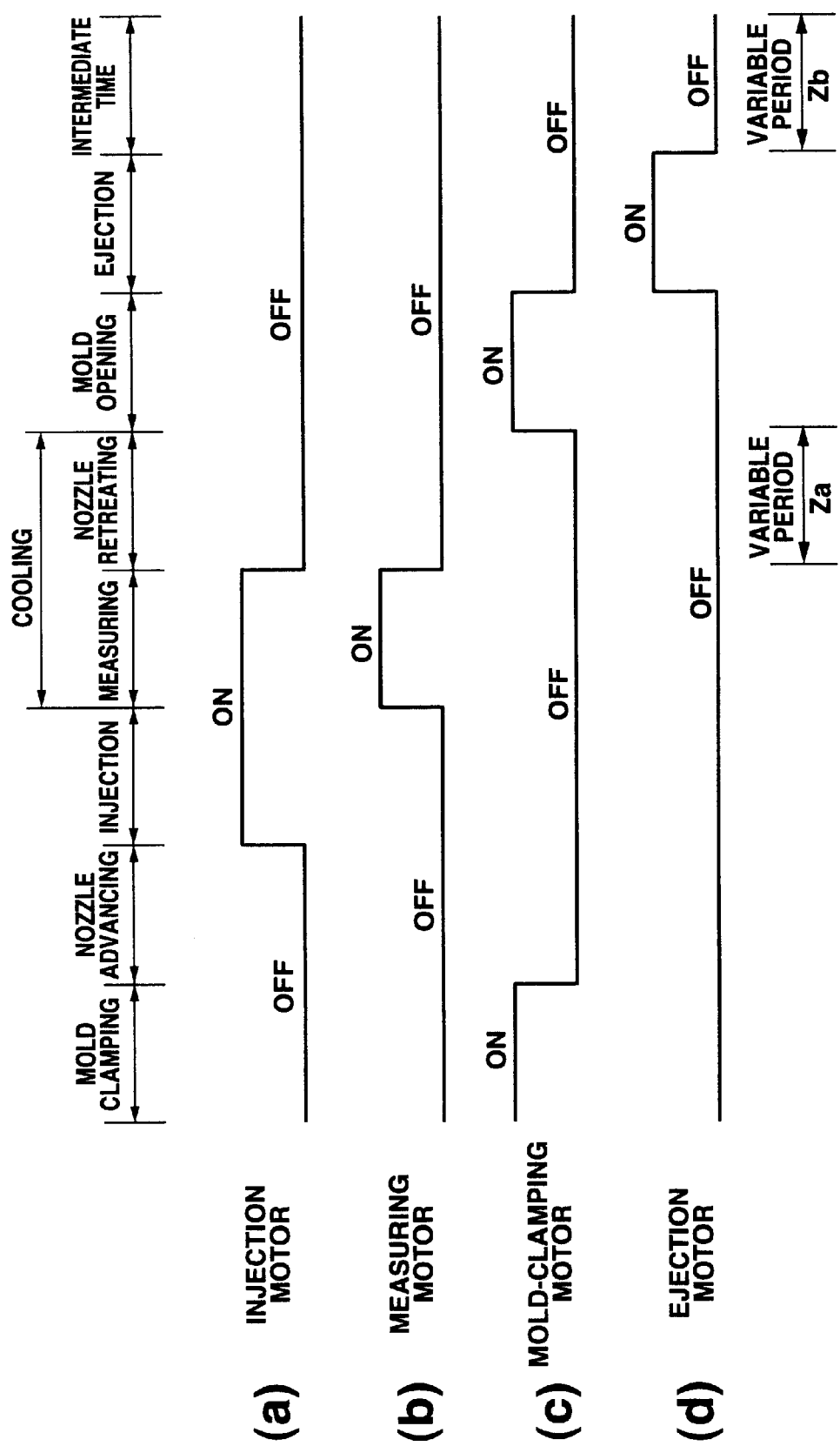
FIG. 4 is a timing chart showing operation of drive motors provided in drive sources of the motor-driven injection molding machine.

FIG. 4 is a timing chart showing operation of the injection motor Ma, the measuring motor Mb, the mold-clamping motor Mc, and the ejection motor Md. In FIG. 4, an OFF does not necessarily mean interruption of electric supply to the motor Ma, Mb, Mc, or Md, but may mean no-load operation of the same.

Description below assumes that a normal molding process is performed. As shown in section (c) of FIG. 4, the mold-clamping motor Mc is operated (as represented by an ON) in a mold-clamping stage (including a mold-closing stage) and in a mold-opening stage, while the load current Ic flows to the mold-clamping motor Mc; and the mold-clamping motor Mc is stopped (as represented by an OFF) in other stages. In a time span ON in which the mold-clamping motor Mc is operated, the overload factor Xc is obtained on the basis of the load current Ic flowing through the mold-clamping motor Mc.

Figure 2:
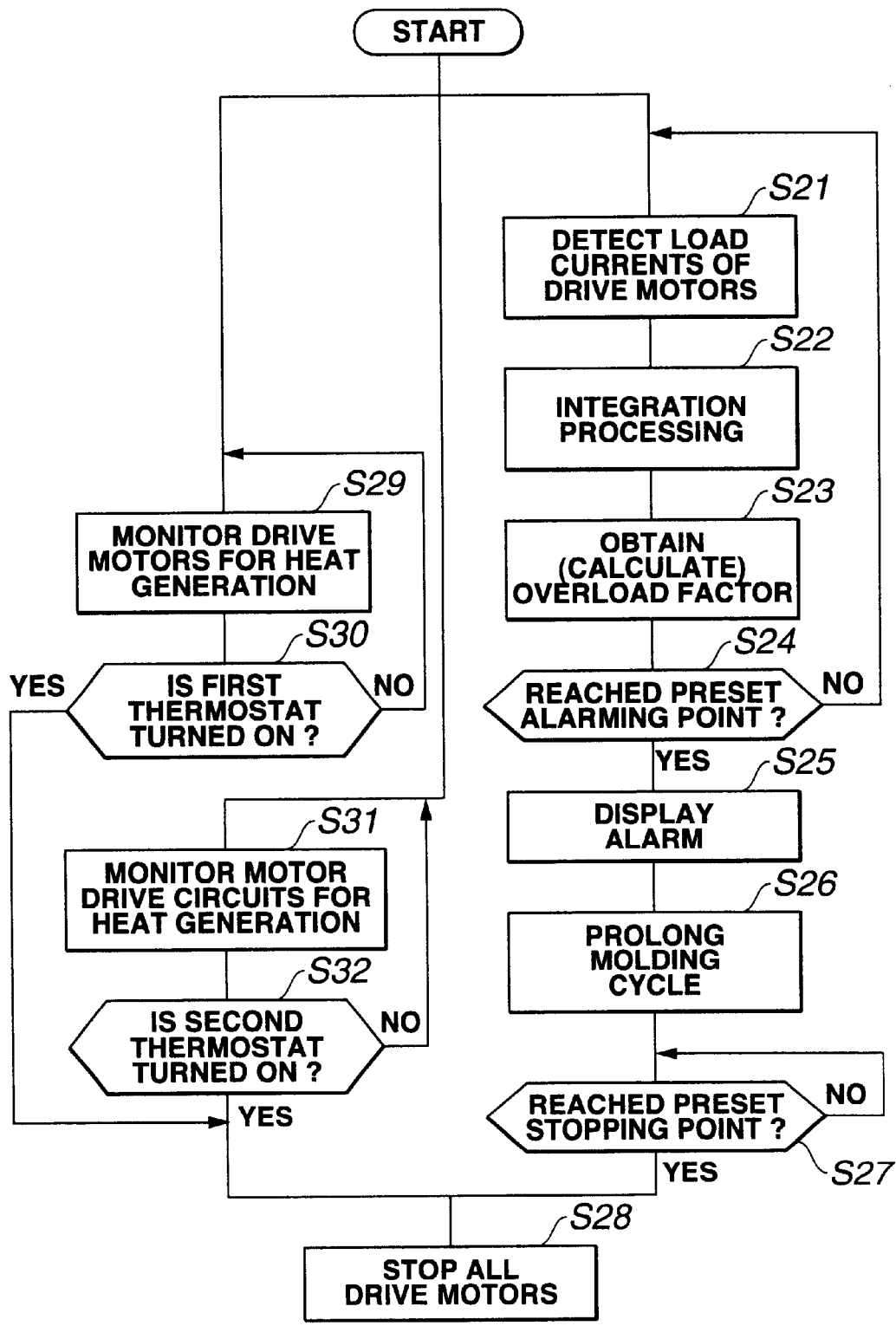
FIG. 2 is a flowchart showing a sequence of operations of a control system in which the control method is carried out.

The overload factor Xc is obtained as illustrated in FIG. 2. First, the load current Ic is detected by means of the current sensor 13 (step S21). The overload factor calculation unit 12 is informed of the detected load current Ic and estimates a heat generation value of the mold-clamping motor Mc on the basis of the detected load current Ic. Specifically, the load current Ic is integrated with respect to time to thereby estimate the heat generation value (step S22). The ratio of the estimated heat generation value to a preset stopping point (preset heat generation value) for stopping the mold-clamping motor Mc is obtained for use as the overload factor Xc (step S23).

Figure 1:
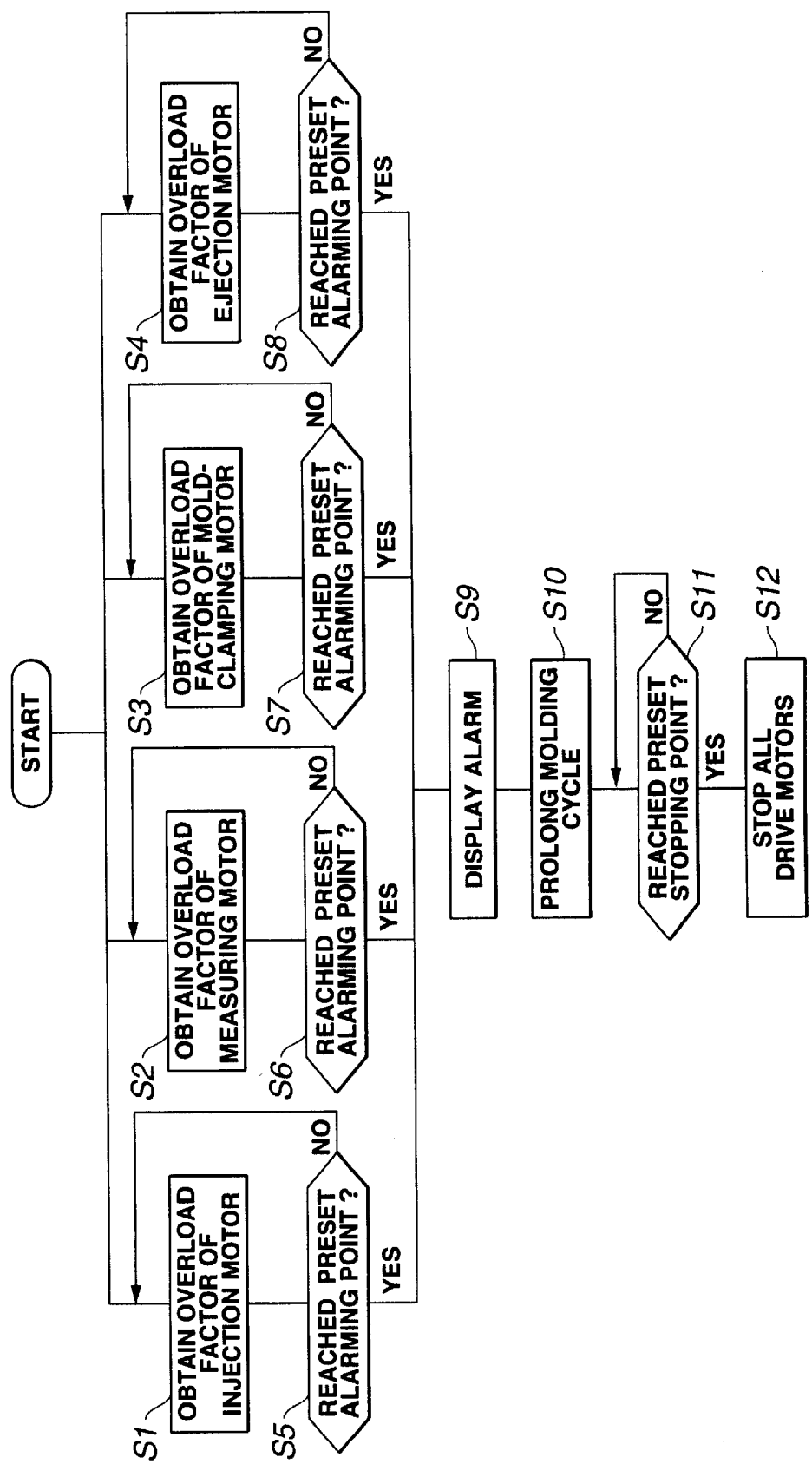
FIG. 1 is a flowchart showing the steps of a control method according to an embodiment of the present invention.

Similarly, as shown in section (a) of FIG. 4, the injection motor Ma is operated (ON) in an injection stage and in a measuring stage, and is stopped (OFF) in other stages. As shown in section (b) of FIG. 4, the measuring motor Mb is operated (ON) in the measuring stage, and is stopped (OFF) in other stages. As shown in section (d) of FIG. 4, the ejection motor Md is operated (ON) in an ejection stage, and is stopped (OFF) in other stages. As shown in FIG. 1, as in the case of the mold-clamping motor Mc described above, the overload factor Xa of the injection motor Ma, the overload factor Xb of the measuring motor Mb, and the overload factor Xd of the ejection motor Md are obtained (steps S1, S2, S3, and S4).

The obtained overload factors Xa, Xb, Xc, and Xd are supplied to the overload factor judgment unit 17. The overload factor judgment unit 17 contains a preset stopping point Xs (100%) for stopping the motor Ma, Mb, Mc, or Md when the motor is overloaded, and a preset alarming point Xf (for example, 80%), which is lower than the stopping point Xs. The alarming point Xf does not need to be determined so as to stop the motor Ma, Mb, Mc, or Md, but is set to such a value that if the motor continues operating at the load factor, transit to the stopping point Xs is highly likely. The stopping point Xs and the alarming point Xf can be experimentally determined for the individual motors Ma, Mb, Mc, and Md.

The overload factor judgment unit 17 monitors the received overload factors Xa, Xb, Xc, and Xd (steps S5, S6, S7, S8, and S24). When any one of the overload factors Xa, Xb, Xc, and Xd reaches the alarming point Xf, the overload factor judgment unit 17 issues an alarm signal to the display processing unit 18. The display processing unit 18 causes the display 19 to display an alarm message (steps S9 and S25). The alarm signal is also issued to the control instruction unit 16. The control instruction unit 16 perform cycle prolong processing for prolonging the molding cycle accordingly (steps S10 and S26). Specifically, when the prolong processing is performed, as shown in FIG. 4, either period Za or Zb or both periods Za and Zb in the molding cycle are prolonged. During the periods Za and Zb, all of the motors Ma, Mb, Mc, and Md are stopped. The period Za is of a nozzle-retreating stage in which the injection unit 1i is caused to retreat. The period Zb is an intermediate time subsequent to an ejection stage. The molding cycle is prolonged according to an excess portion of the overload factor Xa, Xb, Xc, or Xd with respect to the alarming point Xf. Whether to perform the cycle prolonging processing may be determined by an operator.

As a result of prolonging the molding cycle as above, the period of time during which the motors Ma, Mb, Mc, and Md are stopped is prolonged; i.e., cooling time is prolonged. After the molding cycle is thus prolonged, the overload factor judgment unit 17 continues monitoring the overload factors Xa, Xb, Xc, and Xd. When the relevant overload factor(s) drops below the alarming point Xf, the prolonged molding cycle may be returned to the previous molding cycle before prolongation. Alternatively, the prolonged molding cycle may be shortened according to the difference between the alarming point Xf and an estimated heat generation value, which is lower than Xf, but in such a manner as not to become shorter than the previous molding cycle before prolongation.

Thus, if an increase in the overload factor Xa, Xb, Xc, or Xd is transient, interruption of the molding process can be avoided. If the overload factor Xa, Xb, Xc, or Xd remains not less than the alarming point Xf after the elapse of a predetermined time, the processing for prolonging the molding cycle may be performed further if needed. By contrast, if the overload factor Xa, Xb, Xc, or Xd continues increasing even after performance of the cycle prolonging process and then reaches the stopping point Xs, a conceivable cause is not a mere transient increase in overload factor, but is some abnormality or trouble. Thus, at this point of time, the motors Ma, Mb, Mc, and Md are caused to stop (steps S11, S12, S27, and S28).

The first thermostats 14 and the second thermostats 15 directly monitor heat generated by the motors Ma, Mb, Mc, and Md and that from the motor drive circuits 11 (steps S29 and S31). Through combination of the direct monitoring of heat generation and the above-described indirect monitoring of heat generation on the basis of the overload factors Xa, Xb, Xc, and Xd obtained from the corresponding load currents Ic, dual protection is implemented. For example, indirect monitoring of heat generation on the basis of the overload factors Xa, Xb, Xc, and Xd may fail to detect an overload state when a great increase in motor temperature is caused by a change in ambient atmosphere (room temperature). Thus, when any one of the thermostats 14 and 15 outputs a signal indicative of overload, the molding cycle is forcibly stopped (steps S30, S32, and S28). In the present embodiment, setting is performed such that when the molding apparatus is used at an appropriate ambient temperature, an overload state is first detected through monitoring on the basis of the overload factors Xa, Xb, Xc, and Xd and is then detected by the thermostats 14 and 15.

As described above, the method for controlling a motor-driven injection molding machine according to the present embodiment is configured such that, during molding, the overload factors Xa, Xb, Xc, and Xd (estimated heat generation value) of the drive motors Ma, Mb, Mc, and Md are obtained from the load currents Ic flowing through the drive motors Ma, Mb, Mc, and Md and such that, when at least one of the obtained overload factors Xa, Xb, Xc, and Xd reaches the alarming point Xf, which is lower than the stopping point Xs, an alarm is issued, thereby reliably avoiding interruption of molding which would otherwise result from a mere transient overload, resulting in enhanced reliability. Since molding is performed under optimum molding conditions at all times, impairment in molding quality and productivity can be avoided.

Furthermore, when an estimated heat generation value reaches the alarming point Xf, the cycle prolonging processing for prolonging the molding cycle is performed, thereby reliably avoiding unnecessary interruption of molding. Particularly, since the molding cycle is prolonged such that the periods Za and Zb, during which all of the drive motors Ma, Mb, Mc, and Md are stopped, are prolonged, a direct effect of the prolongation on molding conditions can be avoided. If the overload factor Xa, Xb, Xc, or Xd (estimated heat generation value) reaches the stopping point Xs after performance of the cycle prolonging processing, the drive motors Ma, Mb, Mc, and Md are caused to stop, thereby accurately discriminating transient overload from overload caused by abnormality or trouble.

While the present invention has been described with reference to the preferred embodiment, the present invention is not limited thereto. Regarding structural details, shape, technique, among others, modifications and any omission or addition may be possible as needed without departing from the scope of the invention. For example, the above embodiment is described while mentioning the injection motor Ma, the measuring motor Mb, the mold-clamping motor Mc, and the ejection motor Md as drive motors, but is not meant to exclude other drive motors. In the above embodiment, the overload factors Xa, Xb, Xc, and Xd are obtained for use in control; however, an estimated heat generation value may be used as is.

What is claimed is:

1. A method for controlling a motor-driven injection molding machine which includes a plurality of drive motors, each serving as a drive source, comprising:

detecting load current flowing through at least one drive motor;

outputting an overload detection signal upon detection of a preset temperature of the at least one drive motor;

estimating a heat generation value of the at least one drive motor from the load current and the overload detection signal;

stopping the drive motors when the estimated heat generation value reaches a preset stopping point; and issuing an alarm when the estimated heat generation value reaches a preset alarming point, which is lower than the stopping point.

2. A method for controlling a motor-driven injection molding machine according to claim 1, wherein cycle prolonging processing for prolonging a molding cycle is performed when the estimated heat generation value reaches the alarming point.

3. A method for controlling a motor-driven injection molding machine according to claim 2, wherein the cycle prolonging processing is performed to prolong a portion of the molding cycle in which all of the drive motors are stopped.

4. A method for controlling a motor-driven injection molding machine according to claim 2, wherein the cycle prolonging processing is performed to prolong the molding cycle according to an excess portion of the estimated heat generation value with respect to the alarming point.

5. A method for controlling a motor-driven injection molding machine according to claim 2, wherein whether to carry out the cycle prolonging processing is arbitrary determined.

6. A method for controlling a motor-driven injection molding machine according to claim 1, wherein the heat generation value is estimated through integration of the load current with respect to time.

7. A method for controlling a motor-driven injection molding machine according to claim 2, wherein control for stopping the drive motors is performed when the estimated heat generation value reaches the stopping point after performance of the cycle prolonging processing.

8. A method for controlling a motor-driven injection molding machine according to claim 1, wherein the drive motors include at least one or more of an injection motor, a measuring motor, a mold-clamping motor, and an ejection motor.

* * * * *